United States Patent Office 3,347,804
Patented Oct. 17, 1967

3,347,804
MIXTURES OF TIN, LEAD AND ZINC NAPHTHE-
NATES AND OCTOATES AS CATALYSTS FOR
POLYURETHANE FOAMS
Robert A. Buckley, Solon, Ohio, assignor to Ferro Corporation, Cleveland, Ohio, a corporation of Ohio
No Drawing. Filed May 24, 1963, Ser. No. 282,851
4 Claims. (Cl. 260—2.5)

This invention relates broadly to polyurethanes, and more particularly to polyester and/or polyether polyisocyanate foams and the use therewith of tin-lead-zinc catalyst systems.

As is well known, foamed products for cushioning purposes are widely used. Some of these foamed products are being commercially produced by the reaction between polyesters and/or polyethers and polyisocyanates in the presence of activators or catalysts.

Polyurethane foams are also useful for thermal insulation and for acoustical purposes, where sound deadening is desired.

Polyurethane foams as now produced have generally good cell structure, desirably low density, and many other commercially valuable properties. However, they do require catalyst systems which are expensive, the most commonly employed catalyst systems comprising a nitrogen compound (typically an amine, an N-morpholine derivative, or a pyridine type of compound), and a tin compound, usually a stannous salt of carboxylic acid.

I have now found that tin, the expensive component of catalysts used heretofore, may be reduced materially substituting therefor cheaper lead and zinc, while still realizing all the advantages of the prior, high-tin, catalyst.

It is therefore an object of this invention to provide lower-cost foamed products based on polyurethanes.

It is a further object of this invention to provide a polyurethane foam catalyst that is less expensive than those used heretofore.

Another object of this invention is a polyurethane foam catalyst comprising tin, lead and zinc in combination, the tin being present in substantially lower quantities than possible previously.

Another object is to provide a polyurethane foam catalyzed with a tin-lead-zinc catalyst.

Other objects will become apparent in the following description of my invention.

Briefly, my invention consists of the use of a tin compound in combination with lead and zinc compounds as co-catalysts in the well-known reaction between a hydroxy-containing polyester or polyether, in the presence of a small amount of water, with a polyisocyanate resulting in the formation of a polyurethane and carbon dioxide gas to cellulate the foamed material. The foamed material thus produced may be cured before use, or may be used without further curing, depending primarily on matters of convenience and speed of handling in production plants.

As is well known, all or part of the polyesters used in reactions of this sort may be substituted by polyethers; in this regard see United States 2,957,832, colum 3, lines 33–35. Suitable polyethers for use in obtaining improved polyurethane foams are polyalkylene ether glycols such as the mixed polyglycol of ethylene-propylene, polytetramethylene glycol, polypropylene glycol, and polyethylene glycol, etc. Poyethers are generally preferred which have a molecular weight above 700 but those with a molecular weight as low as 500 to 600, or as high as 5000 or even somewhat higher may be used, depending upon the type of foamed product desired. Other suitable polyethers besides the aforementioned mixed polyalkylene ether glycols, such as poly(ethylene-propylene) ether glycols, are polytrimethylene ether glycol, polyneopentylene ether glycol, and polypentamethylene ether glycol and mixtures thereof.

Polyhydric compounds of related structure are those containing more than two OH groups in the polyether or polyester. These OH groups may be terminal or may be attached to non-terminal carbon atoms of the polyether or polyester.

Hydroxyl bearing polyesters of the alkyl type which are useful in carrying out this invention are those usually prepared by the esterification of a dicarboxylic acid (or its corresponding anhydride), such as succinic acid, adipic acid, suberic acid, and phthalic acid with such polyhldric alcohols as ethylene glycol, diethylene glycol, the butylene glycols, glycerol, and trimethylol propane.

Any suitable organic alkylene or arylene polyisocyanate may be utilized in the process of the invention such as tolylene diisocyanate, diphenyl methane 4,4-diisocyanate, naphthalene 1,5-diisocyanate, metaphenylene diisocyanate, 3,3'-bitolylene, 4,4'-diisocyanate, hexamethylene diisocyanate, and durene diisocyanate.

Triisocyanates may also be used in conjunction with one or more of the diisocyanates when more rigidity is desired or when the polyhydroxy reactant is functionally insufficient to give the desired degree of branching.

Prior to my invention, the most commonly used tin-amine catalyst combination was typically a 1:1 ratio of tin compound, usually stannous octoate, sufficient to provide approximately 0.5% tin octoate based on the polyhydroxy compound utilized in the reaction or the equivalent of about 0.14% of the tin cation equivalent based on the polyhydroxy compound.

But I have found that, by utilizing cheaper zinc and lead in the proper combination with tin, I may reduce the tin concentration to about 1/10 of that previously used, or approximately 0.015% tin cation equivalent based on the polyhydroxy compound. Above 0.30 tin octoate (0.085% tin cation equivalent) which is just slightly more than half the tin concentration formerly used, in combination with lead and zinc, the monetary savings are not so great, and the synergistic contribution by the lead and zinc to the combination becomes less significant. Thus I believe the upper limit of tin in my novel catalyst is in the vicinity of 0.085 part tin cation per 100 parts polyhydroxy compound.

I have also found that at a tin concentration below 0.006% tin cation equivalent, based on the polyhydroxy compound, I am unable to achieve commercially acceptable results, regardless of concentration or variation of the lead-zinc components. Thus for the purposes of my invention, I consider the preferred level of tin cation equivalent to be 0.015% of the polyhydroxy compound and the preferred range from 0.010% to 0.025% although my invention contemplates that the tin cation concentration may range from 0.006% up to a maximum of 0.085% based on the polyhydroxy compound.

I consider the use of the lead-zinc-tin combined catalyst for polyurethanes to be novel. Each of the metals individually has been studied in the past, and only tin found suitable.

Lead salts, especially lead carboxylates do indeed catalyze the foam reaction. When used alone, however lead compounds accelerate the foaming reaction so that it proceeds too fast for the rate of polymer formation. The foam rises very rapidly but then shrinks unevenly. The final foam is found to have closed cell structure which is undesirable for most cushioning applications. It has not been found possible to adjust the concentration of lead catalyst to reduce the foaming rate without adversely altering the polymer structure.

Furthermore, investigation of a catalyst comprising 10% tin octoate and 90% zinc naphthenate (8% Zn) in an amount to provide approximately 0.03 part tin cation, per 100 parts polyhydroxy compound, exhibited an extremely slow rise time, too slow to be of commercial utility. A test of a combination of tin and lead without zinc, at a concentration to provide approximately 0.03 part tin cation, per 100 parts polyhydroxy compound, resulted in an extremely dense foam characterized by excessive shrinkage and the expected, and highly undesirable, closed cell structure. Variations of the above noted comparisons are dealt with in more detail in Table III.

Zinc salts are very poor foam catalysts. Foams which, with commercial tin catalysts, require 3–4 minutes to reach a suitable maximum volume, may require 20 times as long with zinc catalyst, and the ultimate volume is generally much smaller than in the commercial case.

While zinc moderation of lead catalyst might appear to be logically possible, I have found no combination or proportion for a lead-zinc salt mixture which gives adequately fast foam rise, open cell structure, and no objectionably large subsequent shrinkage.

However, it was unexpectedly found that such a balance is easily obtained if a small amount of tin salt is present, the total amount of tin as cation being from about 4% to about 60% of the tin normally required when tin is used as the primary catalyst.

Generally, it is to be understood that my ternary tin-lead-zinc catalyst will usually be used in conjunction with the conventionally acceptable amine co-catalysts, and may thus be considered in the nature of a catalyst component, or co-catalyst. However, as is quite apparent, my invention resides in the synergism created by a tin-lead-zinc substitution for tin, as previously used, and to the extent that tin compounds have been, or could be, used as the sole metal containing catalyst for foam production, this invention therefore would not necessarily be limited only to the use of the tin-lead-zinc synergist as a component of a catalyst in conjunction with other co-catalysts.

By way of illustration, then, but not to be considered in any way a limitation upon the contemplated scope of this invention, are working examples illustrating the various embodiments of my invention.

Throughout the following illustrative embodiments of my invention as utilized in producing improved polyurethane foams the following basic formula was used:

| | Parts by wt. |
|---|---|
| Polyhydroxy compound LG56 [1] polyether | 100 |
| Toluene diisocyanate | 41.5 |
| Water | 3.2 |
| Silicone L520 [2] | 1.0 |
| N-methyl morpholine | 0.5 |
| Catalyst (concentration varied experimentally as described in following working examples). | |

[1] Adducts of propylene oxide to glycerine. Colorless liquids, water insoluble; numbers are the average hydroxyl number.
[2] An organo silicone co-polymer of the type disclosed and claimed in United States Patent No. 2,834,748.

The formulation, without the toluene diisocyanate was mixed with a spatula and then mechanically agitated at high speed for 15 seconds. The diisocyanate was rapidly added to the mixture and agitation resumed for an additional 25 seconds. The mix at this point was just beginning to foam. It was poured rapidly into a rectangular box 10″ long, 5″ wide, and 4″ deep.

Observations were made on the rate of foam rise, maximum height and subsequent shrinkage. Heat stability tests were conducted after the foam "loaf" had air cured for 24 hours. Center cuts of the loaf were placed in an oven at 285° F. for approximately 40 hours and the quality of the foam reexamined on removal of the specimens from the oven.

Using the standard composition set forth above, the following standard catalyst was compounded by thoroughly mixing:

| | Percent |
|---|---|
| Lead naphthenate solution (containing 24% Pb) | 45 |
| Zinc naphthenate solution (containing 8% Zn) | 45 |
| Tin (stannous) octoate (28% Sn) | 10 |
| | 100 |

The catalyst contained the following parts meal cation, per 100 parts catalyst:

| | |
|---|---|
| Lead cation | 10.8 |
| Zinc cation | 3.6 |
| Tin cation | 2.8 |

The foregoing catalyst was incorporated into the basic composition according to the procedure described at 0.5% catalyst per 100 parts polyhydroxy compound. In order to illustrate the wide range of anion substitution possible, I emphasize the fact that the identity of the anion is of little consequence so long as the metal compound is an organic derivative and is soluble in the polyhydroxy compound. Lead naphthenate, and tin octoate of the standard catalyst above were held constant and four additional catalyst examples were compounded and run, respectively incorporating zinc isooctoate, zinc 2-ethylhexoate, zinc tallate, and zinc 2-ethylbutoxy propionate, in proportions calculated to provide 3.6 parts zinc cation per 100 parts catalyst, all catalysts employed at 0.5% of the polyhydroxy compound.

Then, holding the basic zinc naphthenate and tin octoate constant as shown in the standard catalyst composition above, four variations in the lead anion were made, maintaining the lead cation concentration constant at 10.8 parts lead cation per hundred parts catalyst, substituting respectively lead 2-ethylbutoxy propionate, lead isooctoate, lead tallate, and lead 2-ethylhexoate. The catalyst concentration was again maintained at 0.5% of the polyhydroxy compound.

A similar substitution was made with tin, maintaining the other anions and cations constant as set forth in the standard composition, the four additional examples, respectively, incorporating tin as tin naphthenate, tin isooctoate, tin neodecanoate, and tin oleate, the tin cation maintained at 2.8 parts per 100 parts catalyst, the catalyst employed at 0.5% of the polyhydroxy compound.

All of the foregoing resulted in good foams, having excellent open cell structure; the height of all foams varying from about 3½ inches to 4½ inches.

From the above, it will be seen that by incorporating zinc and lead cations into the catalyst, in combination with tin, excellent foams displaying a highly desirable cell structure may be achieved.

In addition to the anion variations exhibited above, I have found that lead, zinc, or tin may be incorporated very effectively into my catalyst in the form of a salt of the acids covering a range of $C_2$–$C_{36}$ carboxylic acids (acetic=2 C's, dimer=36 C's) listed below:

lauric
stearic
ricinoleic
tert. butyl benzoic
acetic
dimer acid (a commercial dimer of oleic and/or linoleic acids)
acetylricinoleic
succinic acid monomethyl ester
cinnamic
crotonic
terephthalic monoethyl ester
xanthic
2-ethylhexoxy propionic
9,10-epoxy stearic
12 hydroxy stearic
thiodipropionic acid monolauryl ester cyclohexyl carboxylic
indoleacetic
phenylacetic
chlorophenylacetic
cyclopentyl carboxylic
gamma-pyridine carboxylic
2,2-dimethyl decanoic.

In order to demonstrate the comparable results achieved with my tin-lead-zinc combination, as opposed to a standard, tin-amine catalyst, the catalyst concentrations set forth in Table I below were tested using the standard formulation:

TABLE I.—EFFECT OF CATALYST VARIATION ON FOAM HEIGHT

| | Catalyst (Parts per 100 parts of polyether) | | | Total Catalyst | Foam Height (inches) |
|---|---|---|---|---|---|
| | Sn Octoate (pure) | Zn Naphth. (8% Zn) | Pb Naphth (24% Pb) | | |
| (A) | 0.3 | | | 0.30 | 3.2 |
| (B) | 0.5 | | | 0.50 | 3.0 |
| (C) | 0.030 | 0.135 | 0.135 | 0.50 | 2.8 |
| (D) | 0.050 | 0.225 | 0.225 | 0.50 | 3.0 |
| (E) | 0.030 | 0.202 | 0.068 | 0.30 | 2.2 |
| (F) | 0.050 | 0.338 | 0.112 | 0.50 | 2.8 |

All foams were of good open cell structure.

The foam was made in a standard formulation of 100 g. of LG56 polyether, 41.5 grams of toluene diisocyanate, 3.2 grams water, 1.0 gram L520 silicone, 0.5 gram N-methyl morpholine, plus the above indicated metal catalyst. The foam height cannot be compared with other tests because of uncontrolled variations in ambient temperature from one batch of tests to another.

In Table I, (B) corresponds to standard commercial practice and (D) to my preferred system. The effect of increased zinc and reduced lead is to reduce the speed and the ultimate height of the foam. Thus (E) and (F) which do not vary in ratio to ingredients represents the extreme limit of utility of relative Zn concentration.

From the foregoing it will be seen that using the concentrations of .3 and .5 tin per hundred parts polyhydroxy compound, in the conventional catalyst, a foam height of approximately 3 inches was achieved, whereas with tin reduced to .03 to .05 part per hundred parts polyhydroxy compound in combination with various concentrations of lead and zinc, foams of a height comparable to those achieved using straight tin, in higher concentrations were achieved.

To illustrate the degree of flexibility possible using the ternary catalyst system of this invention, relying on the standard formulation as for the examples of Table I, variations listed in Table II were tested.

TABLE II.—EFFECT OF CATALYST VARIATION ON FOAM HEIGHT

| | Catalyst (parts per 100 parts of polyether) | | | Percent Para-Tertiary butyl Catechol | Foam Height (inches) |
|---|---|---|---|---|---|
| | Sn Octoate (pure) | Zn Naphth. (8% Zn) | Pb Naphth (24% Pb) | | |
| 1 | 0.100 | 0.200 | 0.200 | 0.000 | 5.2 |
| 2 | 0.098 | 0.200 | 0.200 | 0.002 | 3.8 |
| 3 | 0.150 | 0.175 | 0.175 | 0.000 | 5.0 |
| 4 | 0.147 | 0.175 | 0.175 | 0.003 | 5.5 |
| 5 | 0.200 | 0.150 | 0.150 | 0.000 | 6.2 |
| 6 | 0.196 | 0.150 | 0.150 | 0.004 | 5.2 |

All foams were shown to be strong and resistant to tearing after oven aging for 32 hours at 285° F. The formulation used in Table II is substantially that of Table I except that the water is increased to 4.0 grams and 0.05 gram of hexamethylene diamine co-catalyst was also added to each formulation.

In some of the foregoing tests, a minor amount of para tertiary butyl catechol was used. This additive is well-known as an antioxidant for retarding the oxidation of stannous tin to the stannic state. Its presence in amounts up to 20% of the stannous octoate does not have an observably deleterious effect on the foam properties, and may in some cases contribute some further improvement.

From the foregoing the essential elements of my invention will be readily apparent. That is, my invention resides in a ternary tin-lead-zinc catalyst for polyurethane foams, characterized by an amount of tin less than that required when a tin salt is the sole metal-containing catalyst, and relying on the co-action, during the foam formation, of the lead, zinc and tin cations, which may be present in the foam of any organic salts soluble, or otherwise readily dispersible as colloidal or micellar dispersions, in each other or in a common solvent, in such concentrations that the tin cation is present in from about 0.006 to 0.085 part by weight per hurdred parts of polyhydroxy compound and weight of the tin cation being equal to from about 4% to about 150% of the combined weight of the lead plus the zinc cations, the ideal ratio of lead to zinc cations being 3 to 1 by weight, although the ratio can vary from 1.5:1 to 4.5:1.

Table III below emphasizes the need for all three metal cations (tin-lead-zinc) in my catalyst to achieve acceptable results at the optimum tin concentration. Combinations of any two metals without the third, or the use of tin alone, maintaining all individual metal concentrations constant, fails to provide a properly foamed material.

TABLE III
[Standard formulation]

| Test | Percent Cation Based on Polyether | | | Description of Foam |
|---|---|---|---|---|
| | Sn | Pb | Zn | |
| 1 | 0.014 | 0.054 | 0.018 | 100% height;[1] foam very resilient; surface dry after 24 hrs. at room temp.; foam rise rate adequate. |
| 2 | 0.014 | | | 67% height; foam collapsed shortly after attaining its maximum height; final foam dense and commercially useless. |
| 3 | | 0.054 | 0.018 | 80% height; foam objectionably soft; surface very tacky after 24 hrs. at room temp.; foam rise rate adequate. |
| 4 | 0.014 | 0.054 | | 87% height; foam soft; large internal voids causing easy tearing; surface very tacky after 24 hrs. at room temp.; foam rise rate adequate. |
| 5 | 0.014 | | 0.018 | 93% height; foam resilient, surface tacky after 24 hrs. at room temp.; foam rise rate very slow. |

[1] Height is given as maximum foam height in each test expressed as a percentage of maximum foam height in Test 1.

Again, since my invention is intended primarily to achieve a prior result in a more facile and economical manner, the lead-tin-zinc catalyst will be used substantially in conformance with the prior use of tin catalyst in a simple tin-amine catalyst system, the utility of my invention residing primarily in the partial substitution of a quantity of the cheaper metals, lead and zinc, for tin, in order to achieve substantially the same result as obtainable with substantially higher tin in the absence of lead and zinc.

I therefore claim:

1. In the method of producing a polyurethane foam by reacting a polyhydroxy compound selected from the group consisting of a polyester containing at least two hydroxyl groups prepared by the esterification of a dicarboxylic acid with a polyhydric alcohol and a polyether having a molecular weight from about 500 to about 5000 with an organic polyisocyanate selected from the group consisting of alkylene and arylene polyisocyanates, water, and a catalyst, the improvement consisting of the step of including in said reaction in synergistic relationship tin, lead and zinc salts, said salts being selected from the group consisting of the respective naphthenates and octoates in amounts to contribute:

(a) from about 0.006 part to about 0.085 part tin cation per 100 parts polyhydroxy compound,
(b) lead and zinc cations in a ratio of from about 1.5:1 to about 4.5:1 lead to zinc, said combined lead and zinc cations present in an amount equivalent to from about 66% to about 250% of said tin cation.

2. In the method of producing a polyurethane foam by reacting a polyhydroxy compound selected from the group consisting of a polyester containing at least two hydroxyl groups prepared by the esterification of a dicarboxylic acid with a polyhydric alcohol and a polyether having a molecular weight from about 500 to about 5000 with an organic polyisocyanate selected from the group consisting of alkylene and arylene polyisocyanates, water, and a catalyst, the improvement consisting of the step of including in said reaction in synergistic relationship tin, lead and zinc salts, said salts being selected from the group consisting of the respective naphthenates and octoates in amounts to contribute:
(a) from about 0.006 part to about 0.085 part tin cation per 100 parts polyhydroxy compound,
(b) lead and zinc cations in a ratio of from about 1.5:1 to about 4.5:1 lead to zinc, said combined lead and zinc cations present in an amount equivalent to from about 77% to about 110% of said tin cation.

3. In the method of producing a polyurethane foam by reacting a polyhydroxy compound selected from the group consisting of a polyester containing at least two hydroxyl groups prepared by the esterification of a dicarboxylic acid with a polyhydric alcohol and a polyether having a molecular weight from about 500 to about 5000 with an organic polyisocyanate selected from the group consisting of alkylene and arylene polyisocyanates, water, and a catalyst, the improvement consisting of the step of including in said reaction in synergistic relationship tin, lead and zinc salts, said salts being selected from the group consisting of the respective naphthenates and octoates, said salts soluble in the said polyhydroxy compound, and said salts present in an amount to contribute:
(a) from about 0.006 part to about 0.085 part tin cation per 100 parts polyhydroxy compound,
(b) lead and zinc cations in a ratio of from about 1.5:1 to about 4.5:1 lead to zinc, said combined lead and zinc cations present in an amount equivalent to from about 66% to about 250% of said tin cation.

4. In the method of producing a polyurethane foam by reacting a polyhydroxy compound selected from the group consisting of a polyester containing at least two hydroxyl groups prepared by the esterification of a dicarboxylic acid with a polyhydric alcohol and a polyether having a molecular weight from about 500 to about 5000 with an organic polyisocyanate selected from the group consisting of alkylene and arylene polyisocyanates, water, and a catalyst, the improvement consisting of the step of including in said reaction in synergistic relationship tin, lead and zinc salts, said salts being selected from the group consisting of the respective naphthenates and octoates, said salts soluble in the said polyhydroxy compound, and said salts present in an amount to contribute:
(a) from about 0.006 part to about 0.085 part tin cation per 100 parts polyhydroxy compound,
(b) lead and zinc cations in a ratio of from about 1.5:1 to about 4.5:1 lead to zinc, said combined lead and zinc cations present in an amount equivalent to from about 77% to about 110% of said tin cation.

References Cited

UNITED STATES PATENTS

| | | | |
|---|---|---|---|
| 2,897,181 | 7/1959 | Windemuth | 260—77.5 |
| 3,013,906 | 12/1961 | Flowers | 260—75 |
| 3,073,788 | 1/1963 | Hostettler et al. | 260—2.5 |
| 3,208,959 | 9/1965 | Gmitter | 260—2.5 |
| 2,772,245 | 11/1056 | Simon et al. | 260—2.5 |
| 3,136,731 | 6/1964 | Piechota et al. | 260—75 |
| 3,267,047 | 8/1966 | Gmitter et al. | 260—2.5 |

FOREIGN PATENTS 901,056    7/1962    Great Britain.

DONALD E. CZAJA, *Primary Examiner.*

LEON BERCOVITZ, *Examiner.*

J. KLOCKO, G. RAUCHFUSS, *Assistant Examiners.*